Aug. 7, 1956 W. C. STAFFORD 2,757,591
TRACTOR HITCH
Filed June 15, 1951 2 Sheets-Sheet 1
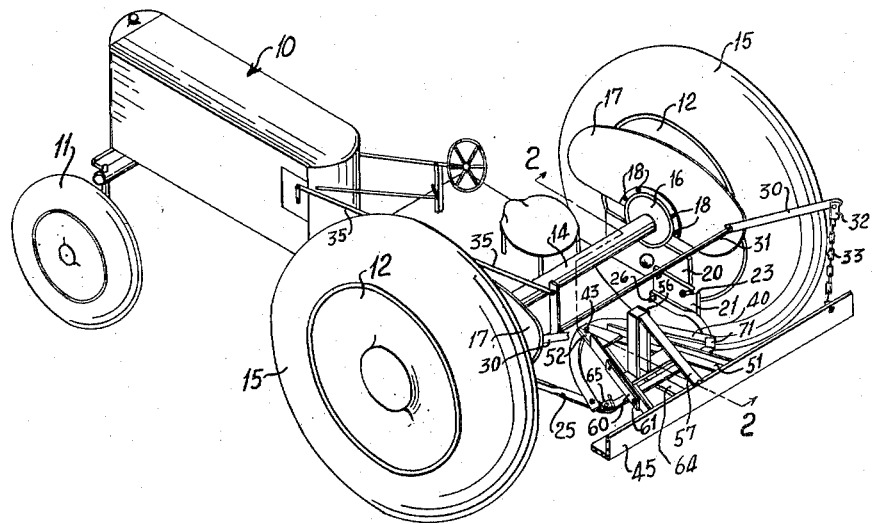
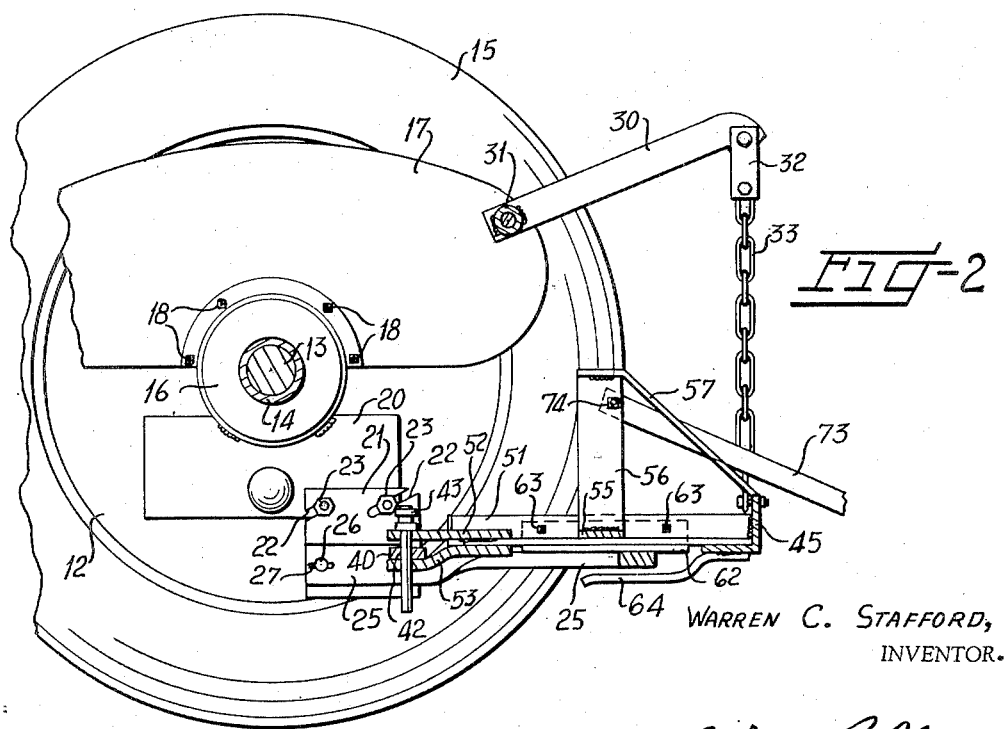
WARREN C. STAFFORD,
INVENTOR.
BY Eaton + Bell
ATTORNEYS

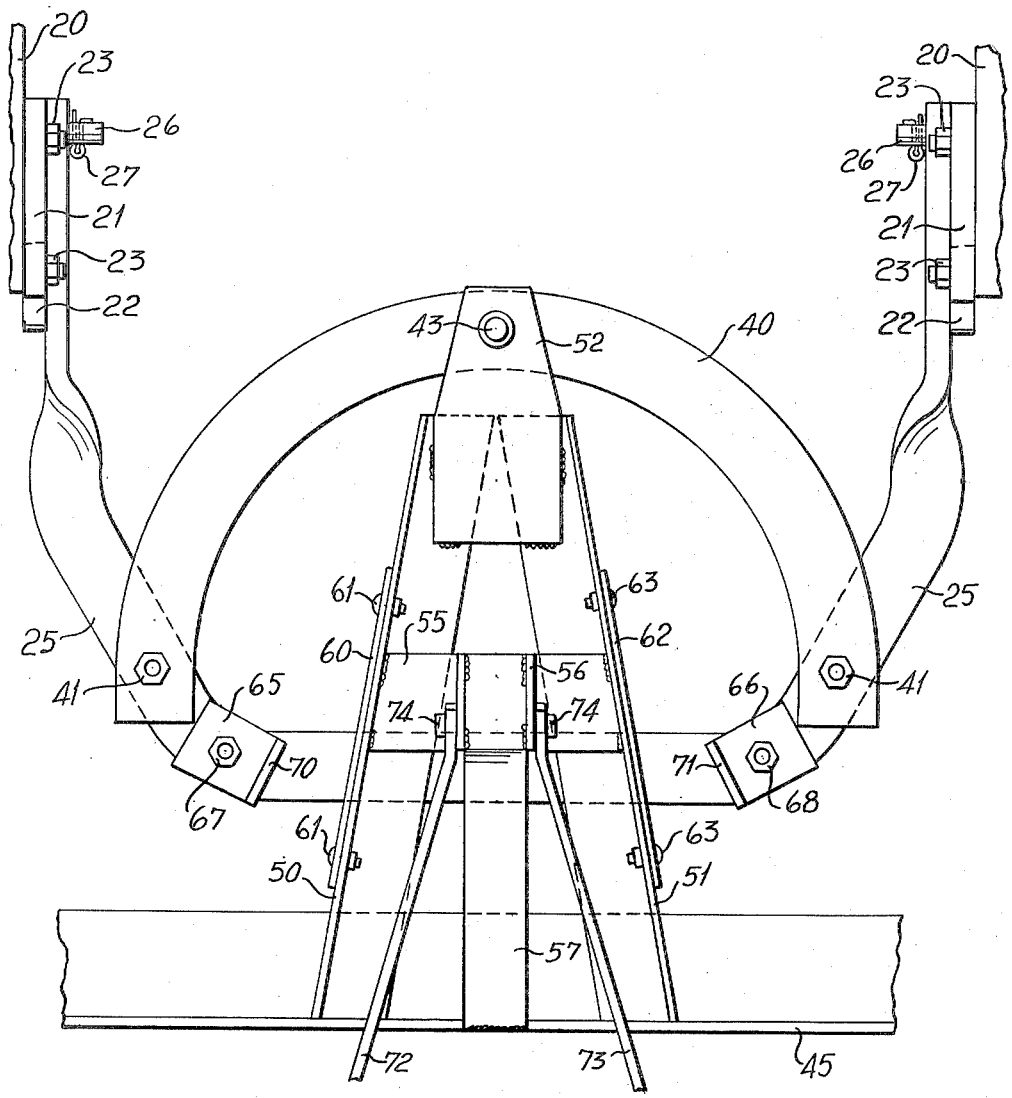

500
United States Patent Office 2,757,591
Patented Aug. 7, 1956

2,757,591
TRACTOR HITCH

Warren C. Stafford, Poplarville, Miss.

Application June 15, 1951, Serial No. 231,690

1 Claim. (Cl. 97—46.59)

This invention relates to an improved tractor hitch and more especially to an improved hitch adapted to be associated with the draw bar of a tractor for hitching implements to the back of said tractor in such a position that the implements may be raised or lowered by conventional hydraulic lifting arms on said tractor.

It is an object of this invention to provide a tractor hitch for connecting an implement to the draw bar of the tractor comprising a substantially U-shaped member having its ends connected to the draw bar of the tractor and extending forwardly of said draw bar in combination with a triangularly-shaped frame pivotally mounted to said U-shaped member and resting on the upper surface of said draw bar and connected to said implement whereby said triangularly-shaped frame will have sliding movement on said draw bar which draw bar will assist in supporting said implement. The draw bar is also pivotally connected to the tractor to permit the implement and said draw bar to be raised by the hydraulic lifting arms of said tractor.

Heretofore, in hitching implements on the tractors having a U-shaped draw bar, a complicated device has frequently been utilized wherein a frame member has been connected to the draw bar which frame member had another frame pivotally mounted therein to permit lateral sliding movement between the two frames. This type of structure has been connected to the rear of the draw bar of the tractor for carrying an implement and it could not be raised or lowered by the conventional lifting arms due to the fact that the connecting point was too far rearward of said lifting arms to permit proper leverage.

It is, therefore, another object of this invention to eliminate the complicated framework which has heretofore been used in hitches of this type and to provide a triangularly-shaped frame connected to an implement and which will rest upon the upper surface of the draw bar and have lateral sliding movement thereon so that the draw bar will act as a fifth wheel therefor and to provide said draw bar with a substantially U-shaped member extending forwardly of said draw bar and to which the triangularly-shaped frame it pivotally connected.

Some of the objects of the invention having been stated, other objects will appear as the description proceeds when taken in connection with the accompanying drawings, in which—

Figure 1 is an isometric view of a tractor with which the improved tractor hitch may be used, and showing an improved tractor hitch in association therewith;

Figure 2 is a fragmentary vertical sectional view through the improved tractor hitch and rear end of the tractor taken substantially along the line 2—2 in Figure 1;

Figure 3 is a fragmentary top plan view of the improved tractor hitch disassociated from a tractor.

Referring more specifically to the drawings, the numeral 10 broadly designates a tractor which may be of any conventional type and which is provided with front wheels 11 and rear wheels 12, said rear wheels being connected by an axle 13 mounted in an axle housing 14.

The wheels 12 are each provided with tires 15. The axle housing 14 has suitable hub housings 16 on opposed ends thereof, only one of which is shown in Figure 1, and the hub housings 16 are each provided with a fender 17 suitably secured thereto as by bolts 18. Each of the hub housings 16 is provided with a plate 20 secured to the lower surfaces thereof. Each of the plates 20 is suitably secured to the hub housing 16 as by welding and depends therefrom to permit an implement to be carried by said tractor at a lower elevation than that of the axle 13.

Each of the plates 20 is provided with a draw bar plate 21 having slots 22 therein and which draw bar plates 21 are adjustably mounted on the respective plates 20 as by bolts 23. The draw bar plates 21 depend from the plates 20 and are provided to permit a conventional U-shaped draw bar 25 to have the free ends or vertical flanges thereof pivotally connected to the draw bar plates 21 as by a stud 26 extending from each draw bar plate 21 and having a cotter pin 27 therein. In conventional usage, the draw bar 25 is usually connected to the draw bar plates 21 by two connections to give a rigid connection rather than a pivotal connection as at 26, the draw bar plate 21 being provided with suitable bores, not shown, for this purpose.

Pivotally mounted in each of the fenders 17 is a hydraulic lift arm 30, said lift arms 30 being connected by a rod 31 and each being provided with a link 32 pivoted thereon and a chain 33 depending therefrom, the lower ends of the chain 33 being connected to an implement, to be described, to permit the implement to be raised by means of the hydraulic lift arms 30. One of the hydraulic lift arms 30 has suitable linkage 35 connected thereto which extends frowardly of said tractor and is connected to conventional or other hydraulic means, not shown, for actuating said lift arms 30 in a conventional manner.

The parts heretofore described are conventional and it is with these parts or similar parts that the present invention is adapted to be associated. In using a conventional draw bar 25, it has heretofore been necessary to connect an implement to the draw bar 25 at the rear end thereof so that the implement will pivot on the draw bar 25 and this would place the implement too far behind the tractor and would prevent proper utilization of the hydraulic lift arms 30 for lifting the implement due to the pivot point being too far rearwardly of the tractor. In this type of structure, the entire pulling weight of the implement was borne at the connection to the draw bar and unrestricted lateral movement was permitted.

The overcome these objections, the present invention provides a substantially U-shaped auxiliary draw bar 40 which has the free ends thereof connected to the draw bar 25 as by bolts 41. The auxiliary draw bar 40 extends forwardly of the tractor and this auxiliary draw bar 40 is provided with a bore 42 disposed intermediate the ends thereof and adapted to have a pin 43 positioned therein for pivotally securing an implement, or tractor hitch, thereto so that the pivot point or point of securement will be disposed substantially forwardly of the conventional draw bar 25.

In combination with the auxiliary draw bar 40, there is provided an improved tractor hitch for pivotally connecting an implement to the auxiliary draw bar 10 which comprises a substantially triangularly-shaped frame which has the apex thereof pivotally secured to the auxiliary draw bar 40 by suitable means such as the pin 43 and the base thereof is connected to the front portion of the implement which in the present illustration is shown as an angle bar 45. The angle bar 45 may be integral with any suitable implement, not shown, or may be connected thereto in any suitable manner. The angle bar 45 has the lower ends of the chains 33 connected thereto to permit the same to be raised by actuation of the hydraulic lift arms 30.

The triangularly-shaped frame comprises angle bars 50 and 51 having their rear ends suitably secured to the horizontal flange of the angle bar 45, as by welding. The rear ends thereof are spaced apart and said angle bars 50 and 51 extend forwardly in converging relation to each other and are secured together by means of a connecting plate 52 of irregular shape having a portion thereof secured to the upper surface of the horizontal flanges of the angle bars 50 and 51, as by welding, and a portion thereof extending forwardly of said bars 50 and 51 and adapted to rest on said auxiliary draw bar 40. The angle bars 50 and 51 are also secured together at their forward ends by a second or lower connecting plate 53 preferably of the same configuration as the connecting plate 52 and having a portion thereof suitably secured to the lower surface of the horizontal flanges of the bars 50 and 51, as by welding. The plate 53 also has a forwardly extending off-set portion adapted to be disposed beneath the auxiliary draw bar 40. The plates 52 and 53 are provided with coinciding bores adapted to have the pin 43 positioned therein for pivotally connecting the same to the auxiliary draw bar 40.

The angle bars 50 and 51 are connected intermediate their ends by a support plate 55, which support plate is provided with an upstanding post which may be in the form of a channel bar 56. A support member 57 extends rearwardly and downwardly from the upper end of the post 56 and has the rear end thereof suitably connected to the angle bar 45 of the implement, as by welding. The angle bar 50 is provided with an auxiliary or supporting angle bar 60 of shorter length than the angle bar 50 and suitably connected to the outer surface of the angle bar 50 as by bolts 61. The angle bar 51 is also provided with an auxiliary angle bar 62 suitably connected thereto as by bolts 63, the angle bars 60 and 62 being identical and serving to strengthen the angle bars 50 and 51 intermediate the ends thereof. The horizontal flanges of the angle bars 60 and 62 are positioned beneath and in engagement with the horizontal flanges of the bars 50 and 51, respectively, and the bars 60 and 62 slidably engage the upper surface of the medial portion of the draw bar 25 so that the draw bar 25 will act as a fifth wheel for the tractor hitch to permit the triangular frame to slide upon the draw bar 25 as it pivots about the pivot point 43. This arrangement permits better control of the implement.

A guide bar 64 has one end thereof suitably connected to the medial portion of the horizontal flange of the angle bar 45, as by welding, and extends downwardly and forwardly beneath the draw bar 25 in closely spaced parallel relation to the draw bar 25 and this guide bar 64 serves to limit vertical movement of the triangularly-shaped frame relative to the draw bar 25.

The draw bar 25 is provided with angle stop members 65 and 66 suitably secured thereto as by bolts 67 and 68, respectively, and each being provided with vertical flanges 70 and 71 adapted to be engaged by the angle bars 50 and 51 to limit lateral movement of the implement as may be desired. If desired, the draw bar 25 may be provided with bores, not shown, to permit adjustment of the stops 65 and 66.

If desired, arms 72 and 73 may be connected to the post 56, as by bolts 74, which arms extend rearwardly and may be connected to a portion of the implement being pulled, not shown, for increased stability.

It should be noted that the pivotal connection of the draw bar 25 to the plates 21 not only facilitates lifting of the implement by the hydraulic lift arms but gives increased flexibility to the entire hitch for greatly improved operation in the field as the entire hitch and implement may move up and down about the pivot points 26 according to the contour of the land.

It is thus seen that there is provided an improved tractor hitch for pivotally connecting an implement to a tractor forwardly of the draw bar and utilizing the draw bar as a support for a sliding portion of the hitch.

In the drawings and specification, there has been set forth a preferred embodiment of the invention and although specific terms are employed, they are used in a generic and descriptive sense only and not for purposes of limitation, the scope of the invention being defined in the claim.

I claim:

A tractor hitch comprising a substantially U-shaped draw bar having the ends pivotally attached to a rear portion of the tractor, an auxiliary U-shaped draw bar having its free ends attached to the rear portion of the first-named draw bar, a substantially triangularly-shaped frame attached at the apex to the forward portion of the auxiliary draw bar and at the base to some portion of the implement which is being towed, a shaft rotatably mounted on the tractor having an arm on one end operable by a hydraulic motor and an arm on the other end, said last-named arm being connected to the implement to be lifted, said shaft being mounted a relatively short distance to the rear of the pivotal connection of the first-named U-shaped draw bar.

References Cited in the file of this patent
UNITED STATES PATENTS

| Number | Name | Date |
|---|---|---|
| 2,077,942 | Lindgren | Apr. 20, 1937 |
| 2,158,316 | Alexander | May 16, 1938 |
| 2,472,905 | Kass | June 14, 1949 |
| 2,473,357 | Blunier | June 14, 1949 |
| 2,506,773 | Bunting | May 9, 1950 |
| 2,534,109 | De Witt | Dec. 12, 1950 |
| 2,604,834 | Silver et al. | July 29, 1952 |
| 2,697,973 | Silver et al. | Dec. 28, 1954 |